United States Patent [19]
Kanamaru

[11] Patent Number: 5,241,399
[45] Date of Patent: Aug. 31, 1993

[54] METHOD OF RECORDING AND REPRODUCING DIGITAL AND VIDEO DATA RELATING TO A MOVING PICTURE ON AND FROM A TWO-REGION RECORDING DISK

[75] Inventor: Hitoshi Kanamaru, Tokorozawa, Japan

[73] Assignee: Pioneer Electronic Corporation, Tokyo, Japan

[21] Appl. No.: 810,454

[22] Filed: Dec. 19, 1991

Related U.S. Application Data

[63] Continuation of Ser. No. 540,861, Jun. 20, 1990, abandoned, which is a continuation of Ser. No. 190,120, May 4, 1988, abandoned.

[30] Foreign Application Priority Data

May 7, 1987 [JP] Japan .................. 62-111438
May 7, 1987 [JP] Japan .................. 62-111439

[51] Int. Cl.$^5$ .................................. H04N 5/76
[52] U.S. Cl. ........................ 358/341; 358/342
[58] Field of Search ............. 358/341, 342, 343; 360/10.1, 10.2, 32, 35.1, 19.1; 369/32, 49, 50

[56] References Cited

U.S. PATENT DOCUMENTS

| | | |
|---|---|---|
| 4,347,527 | 8/1982 | Lainez . |
| 4,383,279 | 5/1983 | Kenney, II .................. 358/341 |
| 4,647,985 | 3/1987 | Yokosawa .................. 358/341 |
| 4,672,471 | 6/1987 | Gouda ........................ 358/341 |
| 4,777,537 | 10/1988 | Ueno et al. ................. 358/341 |
| 4,872,067 | 10/1989 | Okatani ...................... 358/341 |
| 4,872,068 | 10/1989 | Ishii et al. .................. 358/342 |
| 5,018,020 | 5/1991 | Dakin ........................ 358/341 |

FOREIGN PATENT DOCUMENTS 0025277 3/1981 European Pat. Off. .
3607562 9/1986 Fed. Rep. of Germany .
1354910 12/1964 France .

OTHER PUBLICATIONS 59-83483 English Abstract of Japanese Document Published May 14, 1984.
Translation of French Document 1354910.
Translation of German Document 3607562.

Primary Examiner—Donald E. McElheny, Jr.
Attorney, Agent, or Firm—Keck, Mahin & Cate

[57] ABSTRACT

A method of recording and reproducing information on a recording disk records a frequency modulated video signal in one outer region of a recording region of the disk, and records digital data associated with the video signal in another inner region of the recording region of the disk, and in reproduction, reads the digital data recorded in the outer region and stores the data in a data memory, and reads the video signal recorded in the inner region and simultaneously reading out the digital data stored in the data memory and in turn processes the digital data. Thus, the interaction between the recorded video signal and the recorded digital data is provided.

10 Claims, 4 Drawing Sheets

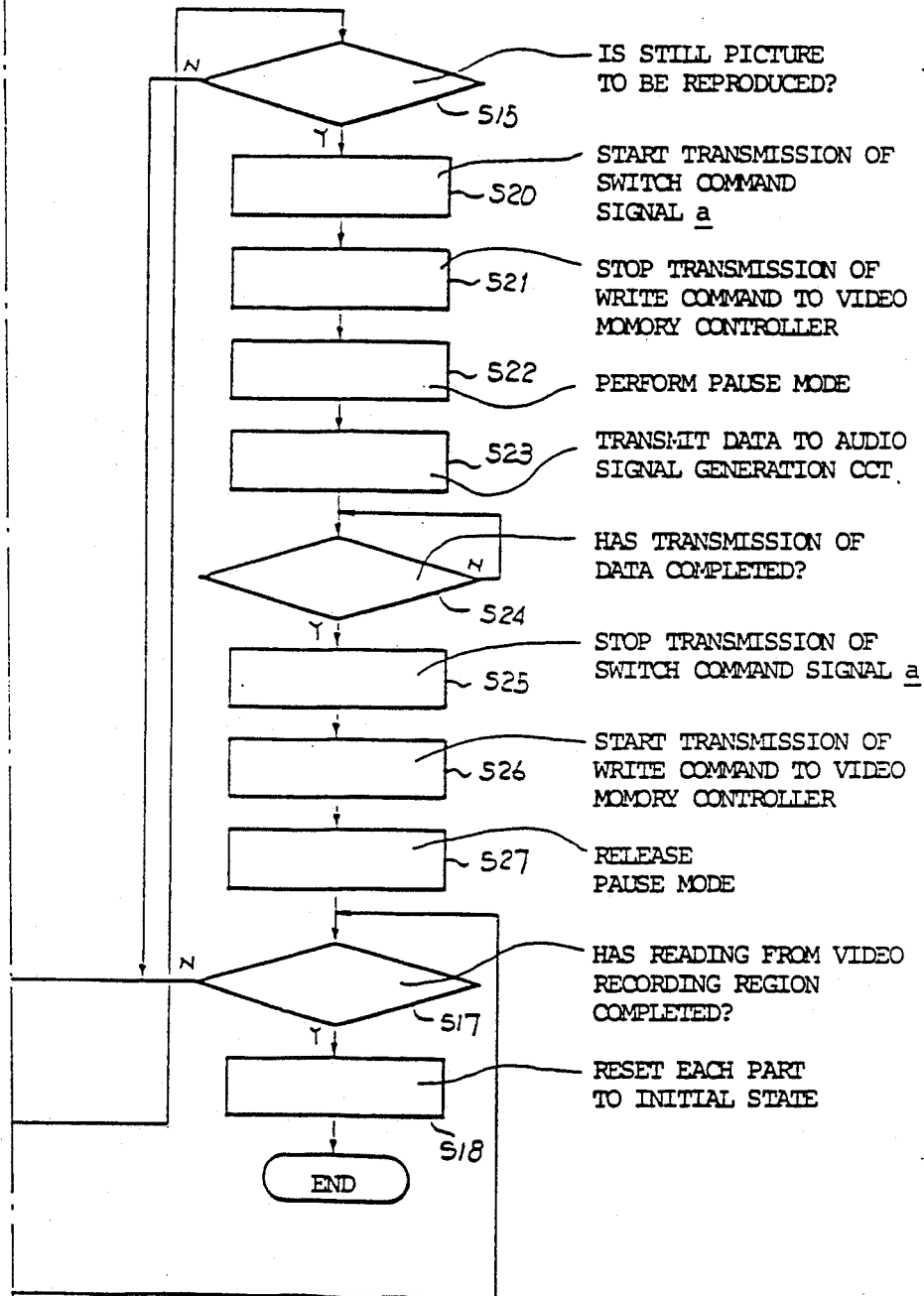

METHOD OF RECORDING AND REPRODUCING DIGITAL AND VIDEO DATA RELATING TO A MOVING PICTURE ON AND FROM A TWO-REGION RECORDING DISK

This application is a continuation of application Ser. No. 07/540,861, filed Jun. 20, 1990, which is a continuation of application Ser. No. 07/190,102, filed May 4, 1988, both have been abandoned.

BACKGROUND OF THE INVENTION

1. Field of the Invention

The present invention relates to a method of recording and reproducing information on and from a recording disk such as a video disk, and to a recording disk, and further relates to a method of reproducing information from a recording disk.

2. Description of Background Information

Optical information recording disks having a compact size which are capable of recording a large quantity of digital data, designated as CD-ROM or CD-I (CD-Interactive), are attracting attention recently in the field of recording technology. However, since the picture information should be digitized in the method for recording and reproducing information on and from this compact-size optical recording disk, a great number of digital bits are required in order that a delicate difference of color in each part of the picture can be expressed. Moreover, there are drawbacks such that a complex procedure is required for the digitalization of the picture information, making it impossible to obtain a picture having a natural appearance, and moreover, only still pictures can be processed practically.

On the other hand, as an application of a recording technique in which a TV picture signal and a digital audio signal are recorded by a frequency division multiplex system, a design improvement an LV-ROM in which a digital data signal is recorded instead of the audio signal. However, in the method of recording and reproducing using this LV-ROM, the quantity of data corresponding to one TV picture is limited at about 5 kilobytes, and there is a drawback that the audio signal and the data signal can not be obtained at the same time.

Therefore, it has been difficult, in conventional methods of recording and reproducing of a recording disk, to make the recorded video signal and the digital signal to interact with each other during the playing time. Therefore, it was not possible with the conventional methods, to present more effective uses of the disk such as the playing of a game having realistic effects, or presenting of an effective explanation of a merchandise, and so on.

SUMMARY OF THE INVENTION

An object of the present invention is therefore to provide a method of recording and reproducing information on and from a disk, which is capable of reproducing a moving picture with sound and also capable of processing a large quantity of digital data associated with the moving picture.

Another object of the present invention is to provide a recording disk by a moving picture with sound and a large quantity of digital data associated with the moving picture can be obtained.

A further object of the present invention is to provide a method of reproducing information from a disk, which is capable of reproducing a moving picture with sound and also capable of processing a large quantity of digital data associated with the moving picture.

A method of recording and reproducing information on and from a disk according to the present invention is characterized by dividing an effective information recording region on one main surface of a recording disk into a first region on an inner peripheral side and a second region on an outer peripheral side, recording a video signal which is converted into a frequency modulation signal and digital data associated with the video signal on the second and first regions respectively, and in reproduction, reading the digital data recorded in the first region and writing the digital data into a digital memory, and subsequently reading the video signal recorded in the second region and simultaneously reading out the digital data stored in the data memory and in turn processing the digital data.

A recording disk according to the present invention is characterized in that an effective information recording region on one main surface of the disk is divided into a first region on an inner peripheral side and a second recording region on an outer peripheral side, and that a video signal converted into a frequency modulation signal and digital data associated with the video signal are recorded in the second and first regions respectively.

A method of reproducing information according to the present invention is characterized by reading digital data recorded in a first recording region of a recording disk and storing the data in a data memory, and reading a video signal recorded in a second recording region of the recording disk and simultaneously reading out the digital data stored in the digital memory and in turn processing the digital data.

BRIEF DESCRIPTION OF THE DRAWINGS

FIGS. 4A and 4B, when combined, are a flowchart showing the operation of the system of FIG. 3; and FIG. 4 is a diagram illustrating the juxtaposition of FIGS. 4A and 4B.

DETAILED DESCRIPTION OF A PREFERRED EMBODIMENT

An embodiment of the present invention will be explained in detail with reference to the accompanying drawings hereinafter.

Figure 1:
FIG. 1 is a block diagram showing the recording region of a recording disk on which the recording is performed according to the present invention.
Figure 2:
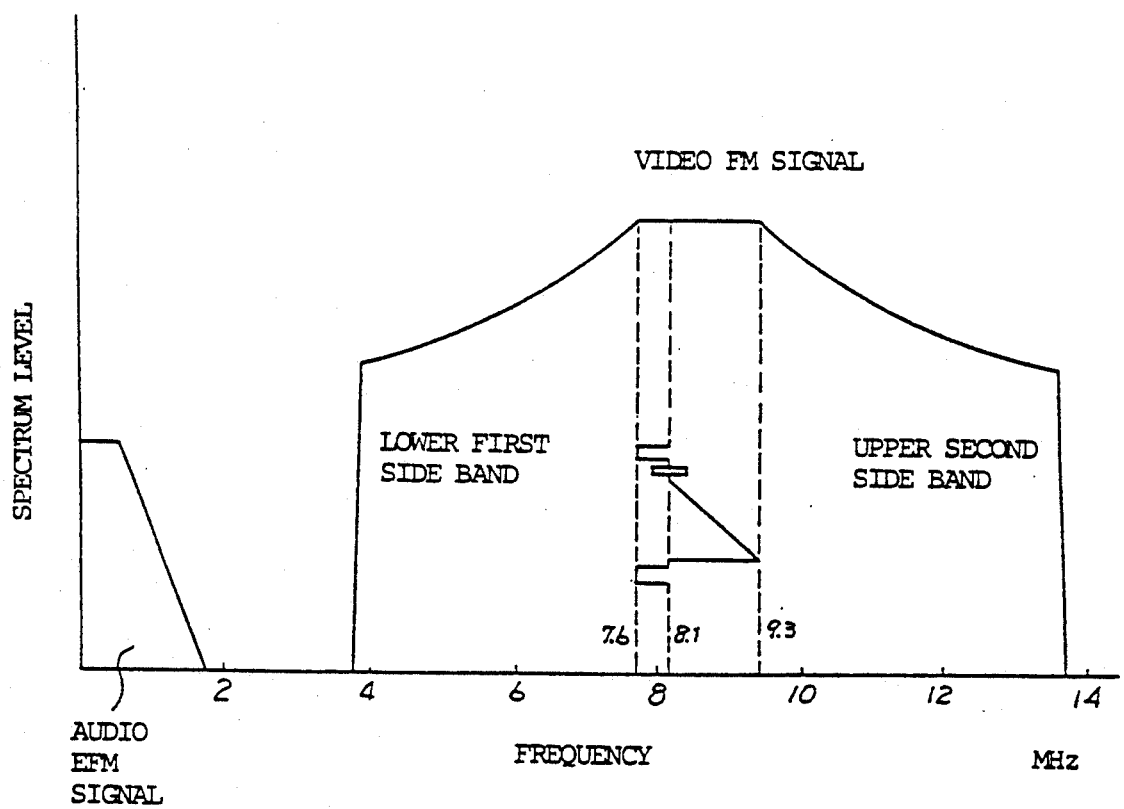
FIG. 2 is a diagram showing the frequency spectrum of the signal to be recorded in the video recording region.

FIG. 1 is a diagram schematically showing a cross-sectional view of a recording disk according to the present invention. In this figure, in a first region $E_1$ located on an inner peripheral side (referred to as digital data recording region hereinafter) of the disk, there is recorded a digital data EFM signal obtained by the EFM system which is adopted in digital audio disks, by means of a known method. In a second region $E_2$ located on an outer peripheral side (referred to as video recording region hereinafter), there are recorded a video FM signal obtained by converting a TV video signal into a frequency modulation signal, as well as an audio EFM signal obtained by modulating by the EFM system an audio signal after being digitized, which signals are processed by frequency division multiplexing, by a known method. The frequency spectrum of the recording signal in this video recording region is as illustrated in FIG. 2.

In order to efficiently recording the digital data EFM signal having a band width of 1.75 MHz and the multiplex FM video signal having the band width of 13 MHz, it is necessary to change the linear velocity in the recording time. Therefore, during the time of recording in the video recording region, the speed of rotation of the disk is made higher than the speed at the time of recording in the digital data recording region.

In the video recording region there are recorded, on a same track, video information composed of moving pictures and still pictures combined arbitrarily, using the standard NTSC television video signal format, and in the audiop EFM signal channel, audio signals corresponding to the moving pictures, compressed audio signals corresponding to the still pictures, and various data signals, using the digital signal format, in such a manner that those signals are related to each frame of the video signal in the sense of time and location.

On the other hand, in the digital data recording region, there is recorded a series of data associated with the video signal recorded in the video recording region (there are cases where the data is associated with the video signal for each frame, and where the data are associated with a series of video signals, as in one chapter). Examples of the content of such data are, time compressed audio data of an explanatory text of a predetermined time length corresponding to the still picture, signals indicating letters or characters, or data signal of pictures to be combined, which are to be displayed by means of the superimposition on the pictures, data signals which are not displayed, but are used for calculations in the player, and control program signals which control the playing operation of the player, for instance. In short, by using the data signals in this digital data recording region, it is possible to obtain varieties of effects and expressions which are more than simply reproducing the video signal and audio signal recorded in the video recording region.

Figure 3:
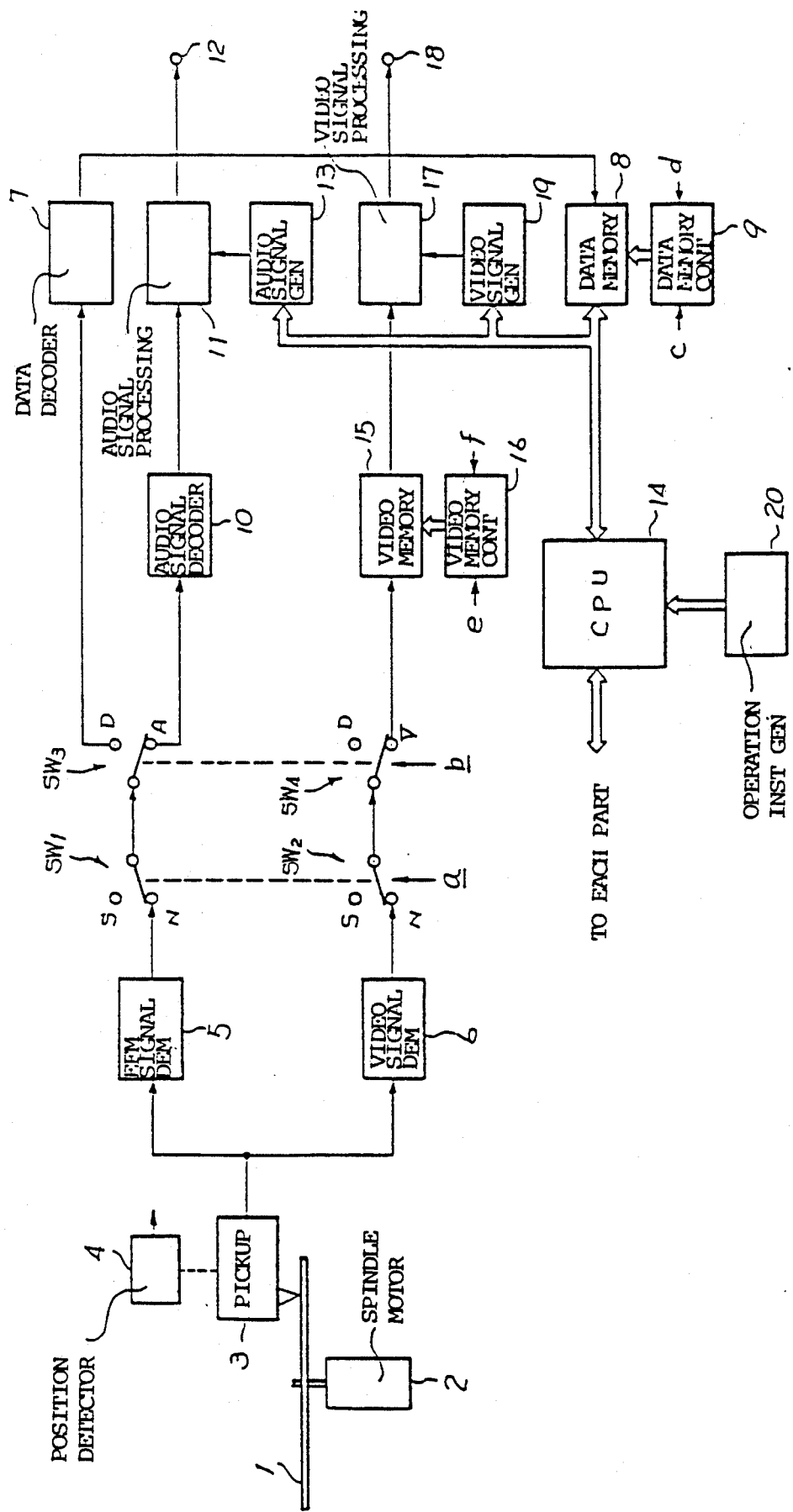
FIG. 3 is a block diagram showing the player system for reproducing the information recorded on the recording disk shown in FIG. 1.

A player for reproducing the above explained recording information of the recording disk is illustrated in FIG. 3. In the figure, the recording disk 1 is driven to rotate by means of a spindle motor 2. The information recorded on this recording disk 1 is read by means of a pickup 3. The spindle motor 2 is controlled, in speed of rotation, by means of a spindle servo system (not shown). An information detecting light spot of the pickup 3 is controlled, in the radial position, by means of a tracking servo system (not shown) so that it traces a recording track accurately. In addition to the above servo systems, there are provided varieties of servo systems such as a focus servo system and a tangential servo system. However, those are omitted in this figure since those are not necessary for the explanation.

Near the path of the movement of the pickup 3 in the radial direction, there is provided a position detector 4 which detects a state that the information detection light spot of the pickup 3 has reached a position corresponding to the vicinity of the boundary between the digital data recording region and the video recording region of the disk 1, and produces a detection signal. By the generation of this detection signal, it can be detected that the information detection light spot of the pickup 3 has reached the video recording region. As the position detector 4, a photo interrupter of the reflection type or the transmission type which is made by a combination of a light emitting element and a light receiving element, and arranged such that the light emitted by the light emitting element is irradiated on the light receiving element, by reflection or transmission, when the pickup 3 has reached a predetermined position, can be used.

A what is called an RF signal issued from the pickup 3 is supplied to an EFM signal demodulation circuit 5 and to a video signal demodulation circuit 6. A demodulation signal of the EFM signal demodulation circuit 5 is supplied to a stationary contact, on an N (normal reproduction) side, of a switch $SW_1$. On the other hand a demodulation signal of the video signal demodulation circuit 6 is supplied to a stationary contact on the N side of a switch $SW_2$. These switches $SW_1$ and $SW_2$ are interlocked with each other, and constructed so that movable contacts are connected to stationary contacts on the N side respectively when a switch control signal a is absent, and the movable contacts are connected to stationary contacts on an S (still picture reproduction) side respectively, when the switch control signal a is present. Signals derived at the movable contacts of the switches $SW_1$ and $SW_2$, are respectively supplied to movable contacts of switches $SW_3$ and $SW_4$. The switches $SW_3$ and $SW_4$ are interlocked with each other, and constructed such that each movable contact is connected to each stationary contact on a D (data) side when a switch control signal b is absent, and each movable contact is connected to a stationary contact on an A (audio) side or a stationary contact on a V (video) side respectively, when the switch control signal b is present.

The signal derived at the stationary contact of the switch $SW_3$ on the D side is supplied to a data decoder 7. Data decoded by the data decoder 7 is supplied to a data memory 8. The data memory 8 is controlled by means of a data memory controller 9. The data memory controller 9 performs the control operation such that the data which is outputted from the data decoder 7 in sequence is written in the data memory 8 in sequence in response to a write command c, and the stored data is read-out sequentially in the order of writing, in response to a read-out command d.

On the other hand, the signal derived at the stationary contact of the switch $SW_3$ on the A side is supplied to an audio signal decoder 10, so that the audio signal is decoded. Output of this audio signal decoder 10 is supplied to an audio signal output terminal 12 after passing through an audio signal processing circuit 11. To the audio signal processing circuit 11, an audio signal issued from an audio signal generation circuit 13 is also supplied, and outputted after being superimposed on the output signal of the audio signal decoder 10 or being switched to replace it.

The audio signal generation circuit 13 generates an audio signal corresponding to the audio digital data supplied from a microcomputer 14.

A signal derived at the stationary contact of the switch $SW_4$ on the D side is not supplied to any of the circuits, and the signal derived at the stationary contact of the switch $SW_4$ on the V side is supplied to a video memory 15. The video memory 15 has a memory capacity capable of recording a video signal of one frame long or one field long, provided with an A/D converter for converting the input video signal to a digital signal, to form data to be written into the memory, and provided with a D/A converter for converting data read-out from the memory to an analog signal, and controlled by means of a video memory controller 16. The video memory controller 16 performs a control operation so that the video signal outputted from the video signal demodulation circuit 6 is written into the video memory 15 in sequence in response to a write command e, and the written video signal is sequentially read-out in the order of recording in response to a read-out command f.

The video signal read-out from the video memory 15 is supplied to a video output terminal 18 through a video signal processing circuit 17. To the video signal processing circuit 17, a video signal issued from a video signal generation circuit 19 is also supplied, and outputted after being superimposed on the output signal of the video memory 15 or being switched to replace it.

The video signal generation circuit 19 generates a video signal corresponding to letters for example, which are designated by data supplied from the microcomputer 14.

The microcomputer 14 comprises a processor, a ROM, and a RAM, and the processor performs the control of each part in accordance with programs previously stored in the ROM, or control programs stored in a data memory 8, or various instructions generated by an operation instruction generator 20.

Figure 4A:
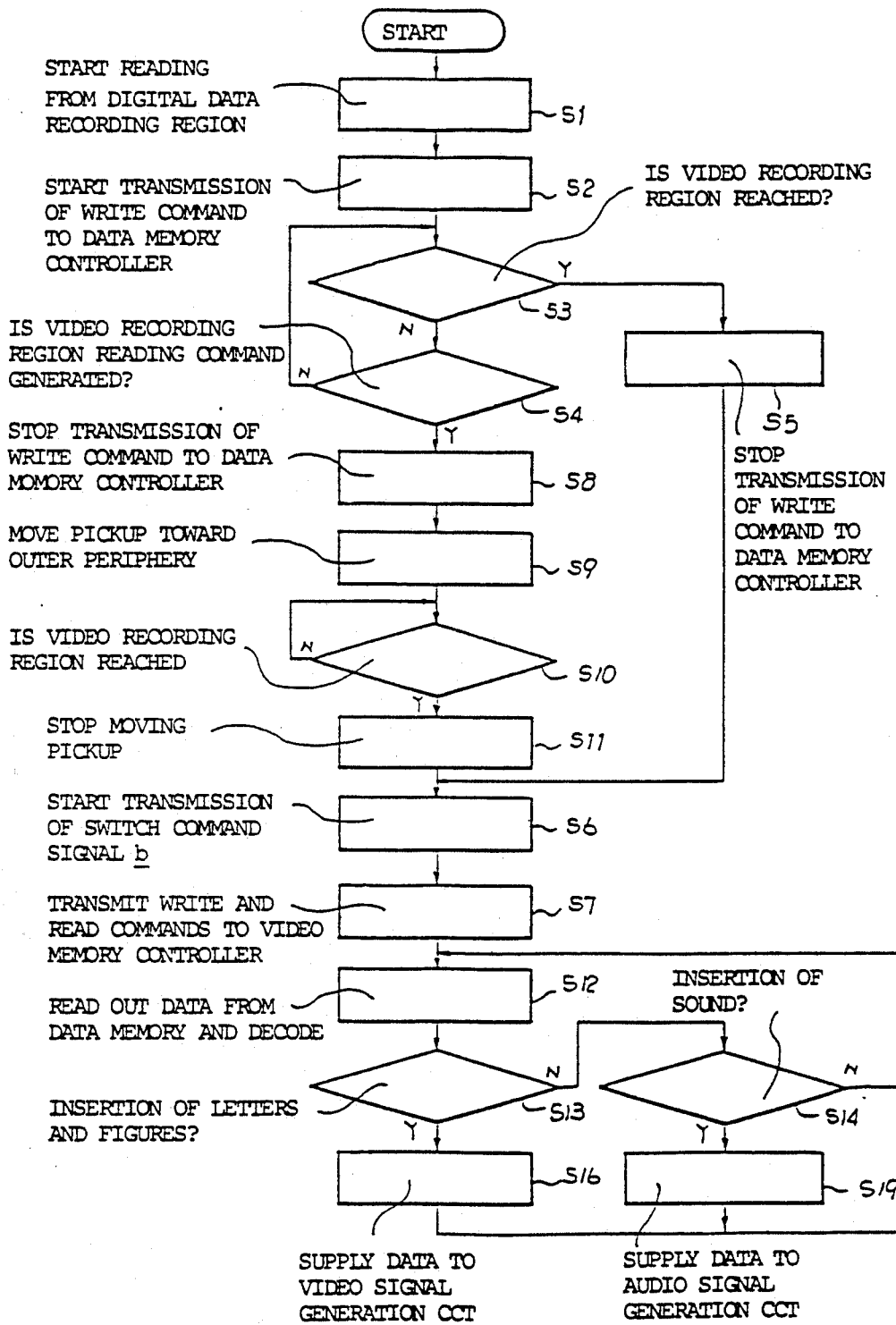

The operation of the processor in the microcomputer 14 with the above described construction will be explained with reference to the flowchart shown in FIGS. 4A and 4B.

When a start command is issued from the operation instruction generator 20, the processor issues instructions to every servo system controlling the pickup 3 and the spindle motor 2, to start the reading of information recorded in the digital data recording region, at a step S1. Then, the processor starts the transmission of a write command c to the data memory controller 9, at a step S2. Accordingly, the digital data EFM signal recorded in the digital data recording region of the recording disk 1 is read. This digital EFM signal is supplied to the EFM signal demodulation circuit 5, so that it is converted to the digital signal, and further converted to the data signal by means of the data decoder 7, and written into the data memory 8. During this operation of reading from the digital data recording region, the FM video signal recorded in the video recording region is not read, and the video signal and the audio signal are not reproduced.

During the reading operation from the digital data recording region, the processor repeatedly executes the detections as to whether or not the information reading light spot of the pickup 3 has reached the video recording region by using the position detector 4, and as to whether or not a video recording region reading command is generated from the operation instruction generator 20, in order, at steps S3 and S4.

At the step S3, if it is judged that the information reading light spot of the pickup 3 has reached the video recording region, the processor stops the transmission of the write command c to the data memory controller 9 at a step S5, and immediately after, generates the switch control signal b at a step S6, and starts the transmission of a write command d and a read command d to the video memory controller 16 at a step S7. At the step S4, if it is judged that the video recording region reading command is issued, the processor stops the transmission of the write command c to the memory controller 9 at a step S8, and moves the pickup 3 in a direction toward the outer periphery at a step S9. Subsequently, detection as to whether or not the video recording region is reached is performed by using the detection signal of the position detector 4 at a step S10, and the movement of the pickup 3 is stopped at a step S11 and processor proceeds to the step S6 if it is judged that the video recording region is reached.

Accordingly, the FM video signal and the audio EFM signal recorded in the video recording region are read, and supplied respectively to the video signal demodulation circuit 6 and the EFM signal demodulation circuit 5. The FM video signal is, after being converted to a video signal by means of the video signal demodulation circuit 6, outputted by way of the video memory 15 and the video signal processing circuit 17. The audio EFM singal is, after being converted to the audio signal by means of the EFM signal demodulation circuit 5 and the audio signal decoder 10, outputted by way of the audio signal processing circuit 11.

During the reading operation from the video recording region, the processor reads the data associated with the video signal read from the disk among data stored in the data memory 8 and decodes it at a step S12.

By means of the data after being decoded, the processor performs judgements as to whether the insertion of video information such as letters, figures is instructed, whether or not the insertion of sound is instructed, and whether or not the reproduction of a still picture is instructed, in sequence, at steps S13, S14, S15.

At the step S13, if it is determined that the insertion of the video information such as letters and figures is instructed, the processor supplies the read data to the video signal generation circuit 19 at a step S16, and judges as to whether or not the reading of all of the information recorded in the video recording region has been completed at a step S17. At the step S17, if it is judged that the reading of all of information recorded in the video recording region has been completed, the processor resets each part to the initial state at a step S18, and restarts the execution of the routine which was executed just before proceeding to the step S1. At the step S17, if it is judged that the reading of all of the information recorded in the video recording region has not been completed, the processor again executes each step from the step S12.

At the step S14, if it is judged that the insertion of sound is instructed, the processor supplies the read data to the audio signal generation circuit 13 at a step S19, and proceeds to the step S17.

At the step S15, if it is judged that the reproduction of a still picture is instructed, the processor generates the switch control signal a so that each movable contact of the switches $SW_1$ and $SW_2$ is connected to the stationary contacts on the S side at a step S20, and stops the transmission of the write command e to the video memory controller 16 at a step S21. At the same time the processor controls the information detecting light spot to jump in the direction toward the inner periphery at predetermined intervals, so that a pause mode is performed at a step S22.

After these operations, the processor transmits the time compressed audio data which has been read, to the audio signal generation circuit 13 at a step S23. Accordingly, the reproduced sound obtained by this time compressed audio data is added to a still picture which is obtained by repeatedly reading the video signal of one field or one frame long stored in the video memory 15, thus reproduction of a still picture with sound is performed.

After the judgment of the completion of the transmission of this time compressed audio data at a step S24, the processor terminates the switch control signal a, so that the movable contacts of the switches SW₁ and SW₂ are respectively connected to the stationary contacts on the N side at a step S25. Then, the processor starts the transmission of the write command e to the video memory controller 16 at a step S26, releases the pause mode at a step S27 subsequently, and proceeds to the step S17.

In the above embodiment, the reading of the data stored in the data memory 8 is performed only when the information recorded in the video recording region is reproduced. However, it is also conceivable to read-out the data stored in the data memory while the digital data is read from the digital data recording region and in turn written in the data memory 8, and to supply the data to the audio signal generation circuit 13 and the video signal generation circuit 19, so that the synthesized audio signal, character video signal, and so on are outputted.

Also, the switches SW₃ and SW₄ are interlocked with each other in the above embodiment. However, it is also conceivable to arrange the switches SW₃ and SW₄ to be operated independently with each other, so that the data signal recorded in the audio EFM signal part is supplied to the data recorder 7 and stored in the data memory 8 at the same time as the reproduction of the video information recorded in the video recording region.

As described in detail so far, the disk recording and reproducing method according to the present invention is characterized in that the video signal converted into the frequency modulation signal and digital data associated with the video signal are respectively recorded in a second region located on the outer peripheral side, and in a first region located on the inner peripheral side, of an effective information recording region on a main surface of the disk, and in reproduction, the video signal recorded in the second region is read and at the same time the digital data stored in a data memory is read out and processed, after the digital data recorded in the first region has been read and written in the data memory. Therefore it is possible to obtain the moving picture signal with sound signal and a large quantity of associated data signal at the same time, so that more effective use of the disk such as the playing of a game having realistic effects and presentation of an effective merchandise explanation, and so on are enabled.

In addition, the recording disk according to the present invention is characterized in that the effective information recording region on one main surface thereof is divided into a first region on the inner peripheral side and a second region on the outer peripheral region, and a video signal converted to a frequency modulation signal and digital data associated with the video signal are recorded in the second and first regions respectively. Therefore, by arranging the reproduction operation such that the video signal recorded in the second region is read and outputted, and simultaneously obtaining from a memory the digital data associated with the video signal, after reading the digital data recorded in the first recording region, and storing the data into the memory. Thus, moving pictures with sound and a large quantity of associated data signals are obtained, so that more effective uses of the disk such as the playing of a game with realistic effects or the presentation of an effective explanation of merchandise, are enabled as mentioned above.

What is claimed is:

1. A method of recording information to and reproducing information from a disk comprising the steps of:
   providing first and second radially spaced recording regions on said disk, said first recording region being spaced closest to the center of the disk;
   recording digital data, the content of said digital data being related to a moving picture to be recorded on said disk, in said first recording region;
   recording video data representing said moving picture in said second recording region;
   detecting whether a reading point of a pickup is in said first recording region or in said second recording region;
   reading said digital data recorded in said first recording region of said disk and storing said digital data into a memory for storing digital data when it is detected by said detecting step that said reading point of said pickup is located in said first recording region; and
   consecutively reading said video data recorded in tracks of said second recording region of said disk and retrieving said digital data stored in said memory for processing while said moving picture is being reproduced from said video data read from said second recording region when it is detected by said detecting step that said reading point of said pickup is located in said second recording region.

2. The method of claim 1, wherein said step of reading said digital data recorded in said first recording region of said disk further comprises the steps of:
   selecting a first demodulator means for demodulating said digital data; and
   supplying digital data demodulated by said first demodulator means to said memory.

3. The method of claim 1, wherein said step of reading said video data recorded in said second recording region of said disk further comprises the steps of:
   selecting a video demodulator means for demodulating said video data; and
   storing the demodulated video data into a video memory.

4. The method of claim 3, wherein said digital data are control program signals which control the timing of video write and video read signals for said video memory.

5. An apparatus for reproducing information from a disk having first and second radially spaced information recording regions, said first recording region being closest to the center of the disk and for storing digital data, the content of said digital data being related to a moving picture to be recorded on said disk, and said second recording region for storing video data representing said moving picture and including audio signal data associated with said video data, the apparatus comprising:
   pick-up means for reading information stored on said disk;
   position detector means for detecting the position of said pick-up means with respect to said disk and for detecting whether said pickup means is positioned in said first recording region or in said second recording region and generating an output signal representative of a result of detection;

first and second demodulator means for demodulating said digital data and said video data, respectively;

control means receiving the output signal of said position detector means for selecting said first demodulator means when said pick-up is reading information from said first recording region and for selecting said second demodulator means when said pick-up is reading information from said second recording region; and memory means connected to said first demodulator means for storing the demodulated digital data, said control means retrieving said demodulated digital data from said memory means and simultaneously receiving the demodulated video data when is is detected by said position detector means that a reading point of said pick-up means is located in said second recording region.

6. The apparatus of claim 5, and further comprising:

data decoding means connected to said digital data memory means;

audio signal processing means for generating as output an audio signal according to said audio signal data stored with said video data;

video signal processing means; and first and second switching means controlled by said control means, said first switching means being associated with said first demodulator means, said data decoding means and said audio signal processing means, and said second switching means being associated with said second demodulator means and said video signal processing means;

said control means controlling said first and second switching means in response to the output signal from said position detector means for connecting said data decoding means to said first demodulator means when said pick-up is reading information from said first recording region of the disk, and for connecting said first demodulator means with said audio signal processing means and said second demodulator means with said video processing means when said pick-up is reading information from said second recording region.

7. The apparatus of claim 6, wherein said first switching means comprises first and second series connected audio/data switches and said second switching means comprises first and second series connected video switches, said first audio/data switch having a normal switching position connected to said first demodulator means and a stationary switching position not connected to said first demodulator means, said second audio/data switch having an audio switching position connected to said audio signal processing means and a digital switching position connected to said data decoding means, said first video switch having a normal position connected to said second demodulator means and a stationary position not connected to said second demodulator means, and said second video switch having a video position connected to said video processing means and a data position not connected to said processor means;

said first audio/data switch and said first video switch being interlocked together to occupy said stationary and normal switching positions simultaneously, and said second audio/data switch and said second video switch being interlocked together to occupy said data switching positions simultaneously and said audio and video switching positions, respectively, simultaneously;

said control means issuing first and second control signals for controlling said first audio/data and said first video data switches, and said second audio/data and said second video switches, respectively, so that said first audio/data and said first video switches occupy said normal switching positions when said first control signal is present and occupy said stationary switching positions when said first control signal is not present, and so that said second audio/data and said second video switches occupy said data switching positions when said second control signal is present, said second audio/data switch occupies said audio switching position and said second video switch occupies said video switching position when said second control signal is not present; and said control means issuing said first control signal and not issuing said second control signal when said pick-up is reading information from said second recording region, and issuing said first control signal and said second control signal when said pick-up is reading information from said first recording region.

8. The apparatus of claim 6, wherein said video signal processing means comprises:

video memory means for storing demodulated video data;

video memory control means for controlling said video memory means; and video signal processing circuitry connected to said video memory means for generating as output said video image signal;

said control means retrieving said demodulated digital data from said digital data memory means and simultaneously issuing video read and video write signals for controlling said video memory control means to read demodulated video data from said video memory to said video signal processing circuitry and to write said demodulated video data into said video memory means, according to said demodulated digital data for creating said video image signal.

9. The apparatus of claim 8, wherein said video memory means has a capacity of one TV frame long, and said video read and video write control signals are issued for combining particular TV frames in creating said video image signal.

10. The method of claim 1, wherein the content of said digital data is sound signals associated with the moving picture represented by said video data to be played back in a predetermined timed relationship with playback of said moving picture.

* * * * *